3,285,956
p-PHENYLENEBIS(DIMETHYLACETIC ACID) AND A PROCESS FOR THE PREPARATION THEREOF
John R. Holsten, Raleigh, William A. H. Huffman, Durham, Loyd G. Kasbo, Chapel Hill, and Jack Preston, Raleigh, N.C., assignors to Monsanto Company, a corporation of Delaware
No Drawing. Filed Mar. 13, 1963, Ser. No. 264,753
5 Claims. (Cl. 260—515)

This invention relates to the preparation of a new composition of matter. More particularly, this invention relates to p-phenylenebis(dimethylacetic acid) and a process for the preparation thereof.

Previous studies have shown that dicarboxylic acid monomers free of hydrogen atoms on the two alpha carbon atoms tend to impart heat stability to their various condensation polymers. The absence of alpha hydrogen atoms in terephthalic acid is believed to contribute to the high thermal stability of its polymers. On the other hand, the presence of alpha hydrogen atoms in adipic acid is believed to contribute to the lower thermal stability of its polymers. Therefore, dicarboxylic acid monomers which contain no alpha hydrogen atoms and which are capable of conversion to reactive difunctional compounds are valuable as organic intermediates in the production of these reactive difunctional compounds and also in the production of polymers and fibers having high thermal stability.

The preparation of acids by the hydrolysis or the corresponding nitriles is well known in the prior art. However, the hydrolysis of p-phenylenebis(dimethylacetonitrile) by conventional methods using sulfuric acid, hydrochloric acid, sodium hydroxide, and the like, resulted only in the formation of 2,2'-p-phenylenbis(2,2-dimethylacetamide). This product was extremely insoluble, and efforts to hydrolyze it further failed even when using strong potassium hydroxide or 50–60 percent sulfuric acid. Although the diamide was soluble in 90–100 percent sulfuric acid, the temperature required for hydrolysis to the diacid led also to considerable decomposition. It has been reported that sterically hindered nitriles may be hydrolyzed using nitrous acid. An attempt to hydrolyze p-phenylenebis(dimethylacetontrile) using nitrous acid resulted in only about one half of the amide groups being hydrolyzed to acid groups and also resulted in considerable decomposition occurring during the reaction. Therefore, it is desirable to develop a method of preparing p-phenylenebis(dimethylacetic acid) from p-phenylenebis(dimethylacetontrile).

It is an object of this invention to prepare an organic dicarboxylic acid monomer which does not contain alpha hydrogen atoms and which is capable of conversion to a number of reactive difunctional compounds.

It is another object of this invention to prepare p-phenylenebis(dimethylacetic acid).

It is a further object of this invention to provide a method for the preparation of p-phenylenebis(dimethylacetic acid).

Other objects and advantages of this invention will be apparent from the following detailed description thereof and the appended claims.

It has been found that p-phenylenebis(dimethylacetic acid) having the formula

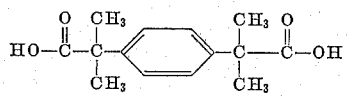

may be prepared by a two step method comprising (1) heating p-phenylenebis(dimethylacetontrile) with an excess of phosphoric acid at a temperature of from about 90° C. to about 125° C. to convert the dinitrile to a nitrogen containing intermediate product and (2) heating this product to reflux (100° C.) with an alkali hydroxide to give nitrogen-free, pure p-phenylenebis(dimethylacetic acid) in high yield.

The process of this invention may be represented by the following equations:

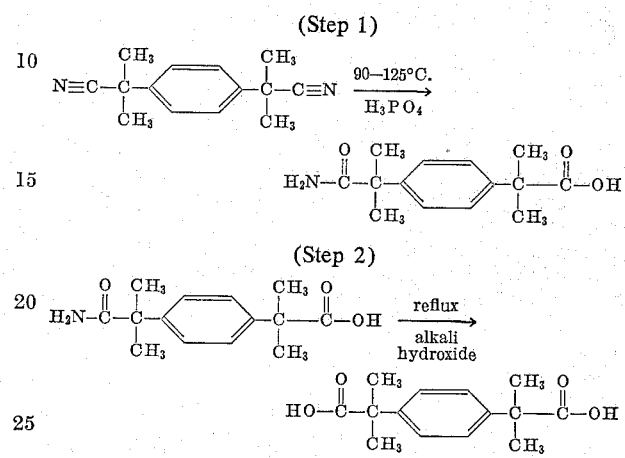

In the first step of the reaction in which the p-phenylenebis(dimethylacetontrile) is heated in the presence of an excess of phosphoric acid, it is important that the temperature be held to within the range of from about 90° C. to about 125° C. It is preferred that the temperature be held within the range of from about 110° C. to about 115° C. If the dinitrile is heated in phosphoric acid at temperatures higher than those specified above, such as 155–165° C., all the nitrogen present will be eliminated, but decarboxylation of the product will also occur. The reaction time necessary to carry out the first step will range from about 10 hours to about 20 hours. It is preferred that the reaction be allowed to run from about 15 hours to about 17 hours.

In the second step of the reaction, the reaction product of the first step is refluxed in the presence of an alkali hydroxide. The reflux (100° C.) will usually require from about 3 hours to about 6 hours. It is preferred that the reflux time be about 4 hours. Any alkali hydroxide may be used to dissolve the reaction product of the first step. However, it is preferred that potassium hydroxide or sodium hydroxide be used.

A generalized preparation of the p-phenylenebis(dimethylacetic acid) of this invention is as follows: A mixture of 21.2 grams (0.1 mole) of p-phenylenebis-(dimethylacetonitrile) and 400 grams (3.47 moles) of 85 percent phosphoric acid is heated with stirring at a temperature of from about 90° C. to about 125° C., preferably from about 110° C. to about 115° C., for a period of from about 10 to about 20 hours, preferably about 15 to about 17 hours, to produce a white solid which is a nitrogen containing intermediate product. The mixture is allowed to cool to room temperature, about 23° C., and is then diluted with an equal volume of water to insure complete precipitation of the white solid. The solid is then filtered off and washed with water to remove all traces of phosphoric acid. This solid is then dissolved in 10 percent alkali hydroxide, preferably sodium or potassium hydroxide. Any insoluble material, usually present in small amounts, is filtered off. The filtrate is then refluxed (100° C.) for from about 3 to about 6 hours, preferably for about 4 hours. The filtrate is then cooled to room temperature, about 23° C., and acidified with 10 percent hydrochloric acid at which point a white precipitate is formed. This white precipitate is filtered off and washed with water. The white precipitate, p-phenylenebis(dimethylacetic acid), may be recrystallized from methanol. A substantially pure product in a yield of 85–100 percent may be obtained using the above method.

The p-phenylenebis(dimethylacetonitrile), melting at 132–133° C., used as a starting material in the preparation of the diacid of this invention may be prepared by a dropwise addition of dimethyl sulfate to p-phenylenediacetonitrile in an aprotic, polar, organic solvent for the p-phenylenediacetonitrile such as tetrahydrofuran, N,N-dimethyl formamide, N,N-dimethylacetamide, dimethyl sulfoxide, and the like. The addition of dimethyl sulfate is started at a temperature of from about 0° C. to about 25° C. The temperature of the reaction mass is allowed to rise slowly, but steadily, throughout the addition of the dimethyl sulfate. The progress of the reaction and the need for temperature increase may be determined by the rate of hydrogen evolution during the reaction.

The invention will now be more fully explained by the following examples. However, it should be understood that these are given by way of illustration, not of limitation, and that many changes may be made in the details without departing from the spirit of the present invention.

Example 1

Preparation of p-phenylenebis(dimethylacetic acid) using two step method of this invention. A mixture of 10.6 grams (0.05 mole) of p-phenylenebis(dimethylacetonitrile) and 200 grams of 85 percent phosphoric acid was heated with stirring at 110° C.–115° C. for 16 hours. The mixture was then cooled to room temperature, about 23° C., and diluted with an equal volume of water. The white solid that formed was filtered off. This solid was washed with water to remove all traces of phosphoric acid. The solid was then dissolved in 200 ml. of 10 percent potassium hydroxide and the small amount of insoluble material left, less than a gram, was filtered off. The filtrate was then refluxed (100° C.) for 4 hours, cooled to room temperature, about 23° C., and acidified by the addition of a slight excess of 10 percent hydrochloric acid to precipitate p-phenylenebis(dimethylacetic acid) as a white solid. The white solid was filtered off and washed with water. After recrystallization from methanol, a yield of 10 grams (80 percent of theoretical) of the diacid, melting at 268–269° C., was obtained.

The following elemental analysis was determined for the p-phenylenebis(dimethylacetic acid) produced above.

Calculated for $C_{14}H_{18}O_4$: C, 67.19; H, 7.24. Found for sample produced: C, 67.19; H, 6.91.

Example 2

Preparation of p-phenylenebis(dimethylacetic acid) using two step method of this invention. A mixture of 84.8 grams (0.4 mole) of p-phenylenebis(dimethylacetonitrile) and 1607 grams of 85 percent phosphoric acid was heated with stirring at 110° C. to 115° C. for 18 hours. The mixture was then cooled to room temperature, about 23° C., and diluted with an equal volume of water. The white solid that formed was filtered off. This solid was washed with water to remove all traces of phophoric acid. The solid was then dissolved in 1800 ml. of 10 percent sodium hydroxide and the small amount of insoluble material left was filtered off. The filtrate was then refluxed for 6 hours, cooled to room temperature, about 23° C., and by the addition of a slight excess of 10 percent hydrochloric acid to precipitate p-phenylenebis(dimethylacetic acid) as a white solid. The white solid was filtered off and washed with water. After recrystallization from methanol, a yield of 93.2 grams (92 percent of theoretical) of the diacid, melting at 268–270° C., was obtained.

Example 3

Attempts to prepare p-phenylenebis(dimethylacetic acid) by standard hydrolysis methods.

A mixture of 2.1 grams (0.01 mole) of p-phenylenebis(dimethylacetonitrile) and 40 ml. of 10 percent sodium hydroxide was refluxed for 14 hours. The solution was cooled and the insoluble material, mainly 2,2'-phenylenebis(2,2-dimethylacetamide) was filtered off. The basic filtrate was acidified with 10 percent hydrochloric acid. Not enough solid was obtained to collect on a filtering funnel. The heating time was varied all the way from 14 hours to 336 hours and potassium hydroxide was used without obtaining any of the desired product.

A mixture of 2.12 grams (0.01 mole) of p-phenylenebis(dimethylacetonitrile), 10.6 ml. of concentrated sulfuric acid and 5 ml. water was heated for 5 hours at 120–125° C. The solution turned dark in color. The solution was cooled to room temperature and then poured onto ice and the solid precipiate was filtered off. The solid was extracted with excess 10 percent potassium hydroxide, leaving behind a small amount of crude amide (1 gram). The basic solution was acidified with 10 percent hydrochloric acid yielding a black intractable tar. Heating temperatures have been varied from 98° C. where one gets mainly the diamide to 130° C. where one obtains tar. Lengths of heating time also have been varied from a few minutes to 5 to 6 hours.

To a stirred solution of 5 grams (0.02 mole) of 2,2'-p-phenylenebis(2,2'-dimethylacetamide)[1] dissolved in 55 mls. of 95 percent sulfuric acid, was added dropwise 1.38 grams (0.02 mole) of sodium nitrile dissolved in the minimum amount of water. The reaction temperature rose from 27° C. to 35° C. during the addition. A cooling bath was used to prevent the temperature from rising over 40° C. during the addition. After completing the addition of sodium nitrile, the reaction mixture was precipitated by pouring the reaction mixture onto ice. The solid on recrystallization from a 50:50 dimethylformamide water mixture, melted at 243–244° C. Nitrogen analysis of product showed it to contain 4.96 percent nitrogen. This is close to calculated value for the half hydrolized amide.

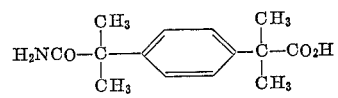

Percent N=5.62. Considerable decomposition accompanied this reaction, giving a very poor yield of product.

Example 4

Hydrolysis of p-phenylenebis(dimethylacetonitrile) using phosphoric acid and high temperature. A solution of 2.1 grams (0.01 mole) of p-phenylenebis(dimethylacetonitrile) and 75 grams of 85 percent phosphoric acid was heated at 145–155° C. for 8 hours. After cooling the mixture was diluted with water and the solid filtered off. A sodium fusion test showed lack of nitrogen in the solid. The solid was completely soluble in 10 percent potassium hydroxide. After treatment with charcoal and filtering, the solution was acidified with 10 percent hydrochloric acid. The white solid obtained was recrystallized from a 50:50 dimethylformamide water mixture. The white solid had a melting point of 255–256° C. Elemental analysis and neutralization equivalent on the product gave evidence that partial decarboxylation had taken place in the reaction.

We claim:
1. A method for the preparation of p-phenylenebis(dimethylacetic acid) which comprises (1) heating p-phenylenebis(dimethylacetonitrile) in the presence of an excess of phosphoric acid at a temperature of from about 90°

---

[1] This diamide was prepared from the dinitrile by heating on a steam bath with an excess of 50 percent sulfuric acid.

C. to about 125° C. to obtain a nitrogen containing intermediate product, and (2) dissolving said intermediate product in an alkali hydroxide and refluxing the resulting solution to obtain said p-phenylenebis(dimethylacetic acid).

2. A method for the preparation of p-phenylenebis(dimethylacetic acid) which comprises (1) heating p-phenylenebis(dimethylacetonitrile) in the presence of an excess of phosphoric acid at a temperature of from about 90° C. to about 125° C. for a period of from about 10 hours to about 20 hours to obtain a nitrogen containing intermediate product, and (2) dissolving said intermediate product in an alkali hydroxide and refluxing the resulting solution for a period of from about 3 hours to about 6 hours to obtain said p-phenylenebis(dimethylacetic acid).

3. A method for the preparation of p-phenylenebis(dimethylacetic acid) which comprises (1) heating p-phenylenebis(dimethylacetonitrile) in the presence of an excess of phosphoric acid at a temperature of from about 110° C. to about 115° C. for a period of from about 15 hours to about 17 hours to obtain a nitrogen containing intermediate product and (2) dissolving said intermediate product in an alkali hydroxide and refluxing the resulting solution for a period of about 4 hours to obtain said p-phenylenebis(dimethylacetic acid).

4. A method as defined in claim 3 wherein the alkali hydroxide used is sodium hydroxide.

5. A method as defined in claim 3 wherein the alkali hydroxide used is potassium hydroxide.

References Cited by the Examiner

Cram et al.: Chem. Abstracts, volume 49, p. 1576a, 1955.

Sperber et al.: Jour. Am. Chem. Soc. vol. 70, pp. 3091–3094, 1948.

R. K. JACKSON, *Primary Examiner.*

LORRAINE A. WEINBERGER, *Examiner.*

T. L. GALLOWAY, *Assistant Examiner.*